United States Patent [19]

Smith

[11] 4,092,536
[45] May 30, 1978

[54] METHOD FOR DETECTING CEMENT VOIDS OR BOREHOLE WASHOUTS

[75] Inventor: Michael P. Smith, Bellaire, Tex.

[73] Assignee: Texaco Inc., New York, N.Y.

[21] Appl. No.: 690,500

[22] Filed: May 27, 1976

[51] Int. Cl.² .............................................. G01V 5/00
[52] U.S. Cl. ...................................... 250/265; 250/266
[58] Field of Search ................................. 250/265, 266

[56] References Cited

U.S. PATENT DOCUMENTS

| 3,823,319 | 7/1974 | Tittman | 250/265 |
| 3,906,224 | 9/1975 | Scott et al. | 250/266 X |

Primary Examiner—Archie R. Borchelt

Attorney, Agent, or Firm—Carl G. Ries; Thomas H. Whaley; William J. Beard

[57] ABSTRACT

A fast neutron source is used to irradiate earth formations in the vicinity of a well borehole. Dual spaced epithermal neutron detectors are used to sample the epithermal neutron population at two different spaced distances from the source. A compensated formation porosity is obtained from the ratio of counting rates at the dual spaced detectors. An uncompensated porosity value is obtained from the count rate at the short spaced detector. Borehole washout or cement void regions are located by comparing the compensated and uncompensated values of formation porosity obtained in this manner.

5 Claims, 4 Drawing Figures

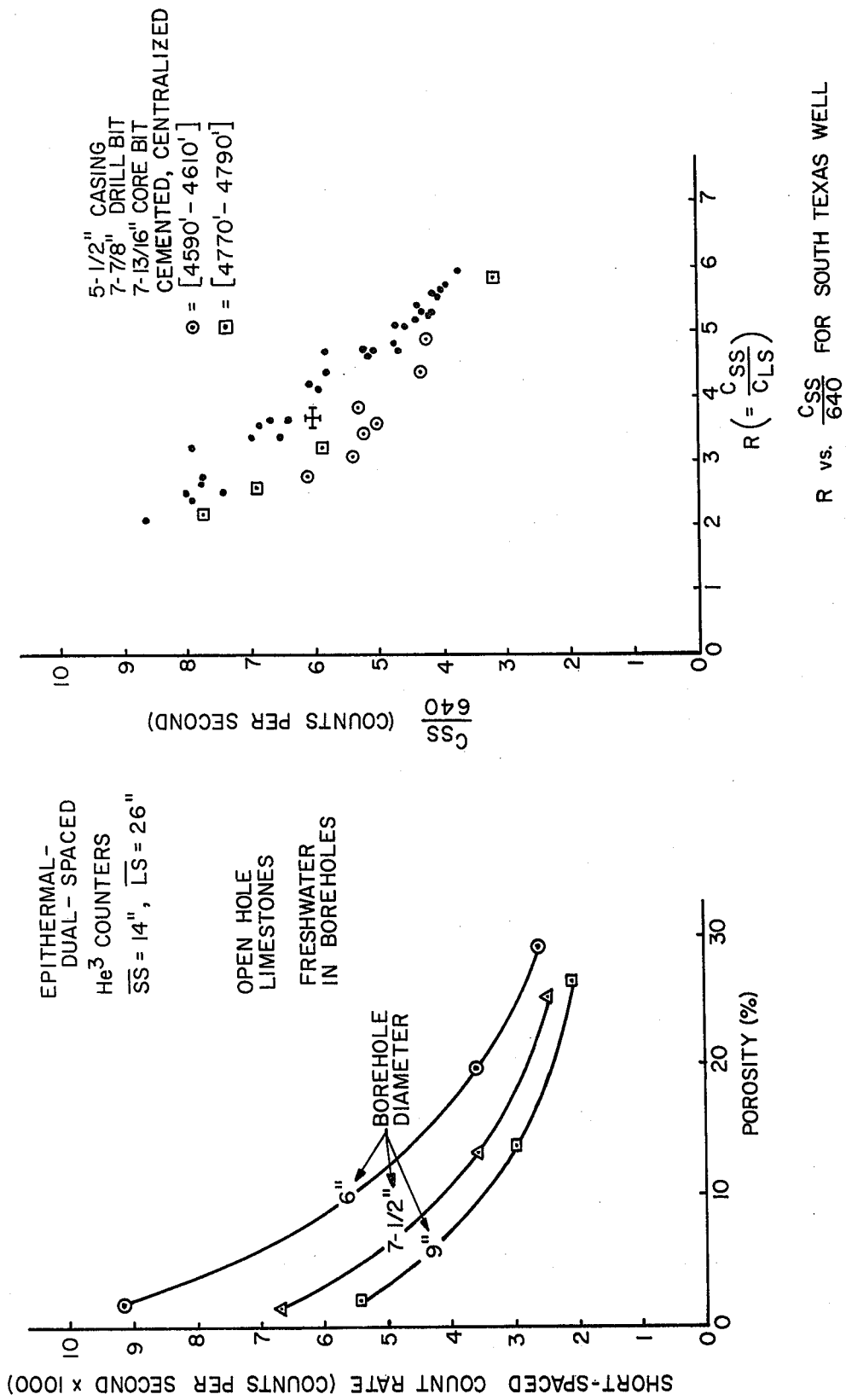

METHOD FOR DETECTING CEMENT VOIDS OR BOREHOLE WASHOUTS

BACKGROUND OF THE INVENTION

This invention relates to radiological well logging methods and apparatus for investigating the characteristics of subsurface earth formations traversed by a borehole and more particularly to apparatus and methods for measuring earth formations porosities and borehole washouts or cement voids by means of neutron well logging techniques.

It is well known that oil and gas are more likely to be found in commercially recoverable quantities from those earth formations which are relatively porous or permeable than in more highly consolidated earth formations. Thus, equipment and methods for accurately identifying the porosity of earth formations has substantial industrial importance.

Various methods and apparatus have been proposed in the prior art for utilizing neutron slowing down and diffusion through earth formations to measure porosity. Typically, proposals of this sort have suggested the use of a pressure housing sonde containing a neutron source and a pair of neutron detectors spaced at different distances from the source for transport through a borehole. The thermal neutron detectors utilized in prior art techniques have been used with both pulsed and continuous neutron sources and some combination utilizing the count rate of the detected thermal neutrons has been related to the hydrogen content of the portion of the earth formation being subjected to the flow of neutrons from the neutron source. These methods have generally not proven to be as accurate as desired due to the diameter irregularities of the borehole wall. The variation of the properties of different borehole fluids, the irregular cement annulus surrounding the casing in a cased borehole, and the properties of different types of steel casings and earth formations surrounding the borehole have all tended to obscure the thermal neutron measurements suggested in the prior art.

The thermal neutron population surrounding a source and detector pair sonde as proposed in the prior art can be affected by the chlorine content of the borehole fluid. Similarly other lithological factors such as the boron content of the earth formations surrounding the cased borehole affect thermal neutron populations. Measurements of thermal neutron captures are utilized in neutron lifetime logs or thermal neutron population die away logs of various types as contemplated in the prior art. The present invention, however, rather than relying on a measure of the thermal neutron population, utilizes a measurement of the epithermal neutron population by means of two spaced neutron detectors each longitudinally spaced from a neutron source having a relatively high intensity neutron flux. Special detector means are utilized in the invention to effectively discriminate against the detection of thermal neutrons as proposed in the prior art. Moreover, by comparing the compensated porosity measurement using the dual speed detectors with an uncompensated porosity measured by the use of only one of the detectors, the location of borehole washouts or cement voids can be found.

In accordance with the invention, a relatively high intensity continuous neutron source irradiates earth formations surrounding a well borehole with a flux of neutrons. A pair of epithermal neutron detectors spaced longitudinally along the axis of the well tool from each other and from the neutron source measure the intensity of the epithermal neutrons at two different distances from the source. The ratio of the count rate occurring in each of the two spaced epithermal neutron detectors are then interpreted in terms of the earth formation porosity in accordance with a predetermined relationship. The porosity is also computed by the use of the count rate at the near detector alone. A comparison of the difference of the dual detector porosity and the single short spaced detector porosity can then be used to locate cement voids or washouts.

The apparatus of the present invention has been found to give improved results from prior art devices in that less sensitivity to disturbing environmental parameters results from its use in the dual detector compensated porosity measurement.

For a better understanding of the present invention, together with other and further objects, features and advantages, reference is made to the following detailed description thereof, when taken in conjunction with the appended drawings in which:

BRIEF DESCRIPTION OF THE DRAWING

FIG. 3 is a graphical relationship showing the count rate at the short spaced detector as a function of porosity; and FIG. 4 is a cross plot of the short spaced count rate vs. the ratio of count rates at the two detectors illustrating the location of washout or cement void regions in a South Texas well.

DESCRIPTION OF THE PREFERRED EMBODIMENTS

Figure 1:
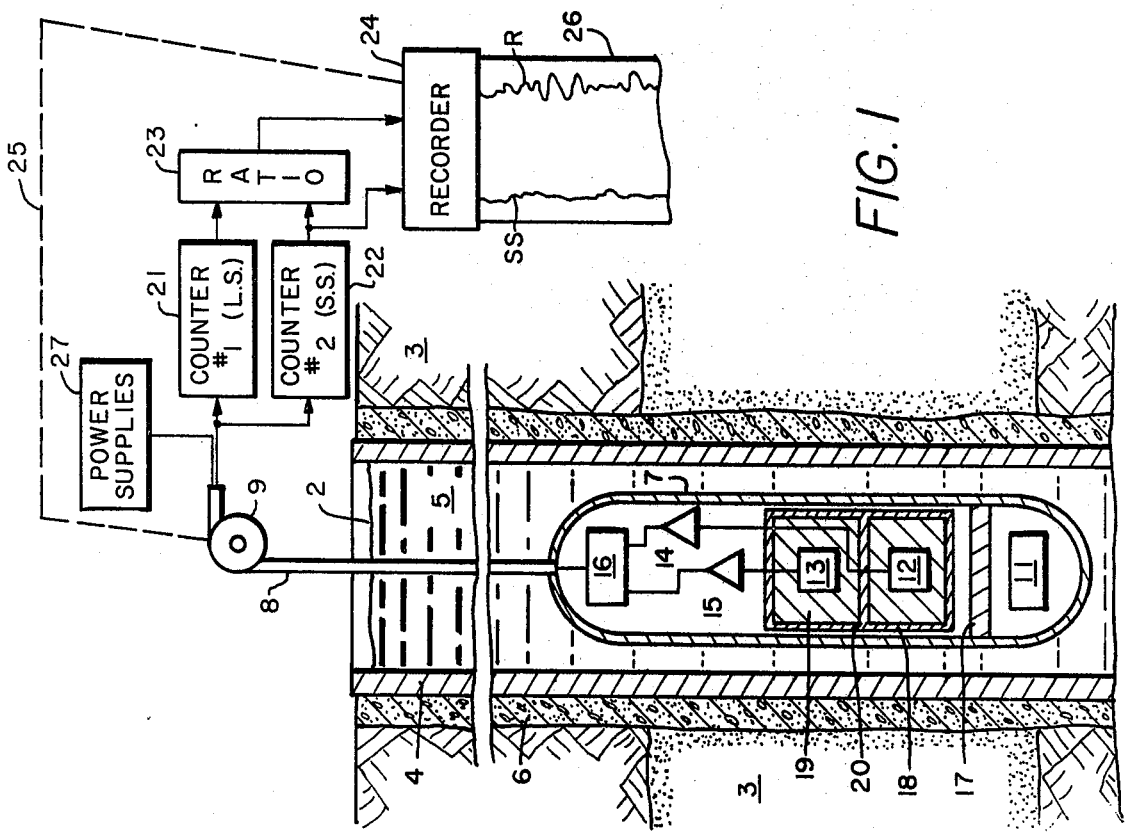
FIG. 1 is a schematic diagram showing a well logging system in accordance with the principles of the present invention.

Referring initially to FIG. 1 there may be seen a simplified, schematic, functional respresentation in the form of a block diagram of well logging apparatus in accordance with the present invention. A well borehole 2 penetrating earth formations 3 is lined with a steel casing 4 is cemented in place by a cement layer 6 which also serves to prevent fluid communication between adjacent producing formations in the earth 3.

The downhole portion of the logging system may be seen to be basically composed of an elongated, fluid tight, hollow, body member or sonde 7 which, during the logging operation, is passed horizontally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The well logging cable 8 may be of conventional armored design having one or more electrical conductors for transmitting such signals between the sonde 7 and the surface apparatus.

Again referring to FIG. 1, the sonde 7 contains a neutron source 11. One neutron source contemplated for use herein comprises a Californium 252 continuous neutron source. Such a source has the meritorious feature of producing a very high intensity of neutrons essentially having an average energy of 2.3 MEV. Alternatively, an actinium beryllium neutron source having an intensity of approximately $1 \times 10^8$ neutrons/sec. may be used to advantage as will be discussed in more detail subsequently. However, it will be understood by those skilled in the art that the invention is not limited to the use of a continuous neutron source. It is contemplated that a pulsed neutron source of suitable intensity could be used if desired, provided that suitable source to detector spacings are also provided. For the purposes of the preferred embodiments of the present invention, however, the high intensity of the Californium 252 or AcBe neutron sources is desirable.

Suitable radiation detectors 12 and 13 longitudinally spaced from each other and from the neutron source 11 are provided in the downhole tool. These detectors are operated as neutron detectors. In the present invention it is contemplated that detectors 12 and 13 are neutron detectors of the $He^3$ type. These are gas filled counting tubes filled with $He^3$ gas under pressure. The $He^3$ respond to neutrons scattered back to the detectors 12 and 13 from the surrounding earth formations. Charge pulses established from nuclear reactions between the back scattered neutrons and the filling gas within the detectors 12 and 13 produce a satisfactory measure of the epithermal neutron population. Detectors 12 and 13 are connected to amplifiers 14 and 15 respectively which are connected to cable driving circuitry 16 for transmission of the electrical pulse signals from the detectors to the surface. Cable driving circuitry 16 may comprise, for example, an amplifier and means for encoding the pulses from the two detectors for transmission on the cable. This could be done, for example, by transmitting pulses from the detectors as opposite signed electrical pulses on the cable in order that they may be distinguished and separated at the surface. Of course, other means could be used as desired. The portion of the sonde 7 between the neutron source 11 and detectors 12 and 13 is provided with a shield 17 of a neutron moderating material, for example, steel and lucite. This is provided in order to prevent the direct interaction of neutrons from the source with the two detectors since it is desired to measure the slowing down effect of the formations surrounding the borehole on the epithermal population.

Neutron detectors 12 and 13 of FIG. 1 are surrounded and enclosed by a cadmium shield 18 which is designed to screen out the entry of thermal neutrons to the interior of the detector structure. The higher energy epithermal neutrons penetrate the cadmium shield 18 more readily. Inside the cadmium shield 18 the neutron detectors are surrounded by and embedded in lucite plastic layer 19 (or any other suitable high hydrogen content material). The cadmium layer surrounding the lucite shield is approximately 0.020 inches in thickness which is adequate to effectively attenuate the thermal neutron flux entering the detectors from the borehole. Moreover, the detectors are spaced from the neutron source at an optimum distance to provide good counting statistics and formation porosity signal. The short spaced neutron detector 12 is preferably sized about 1 inch in diameter and has about 4 inches of effective sensitive length and contains $He^3$ at 1 atmosphere pressure. The long spaced detector 13 is sized about 2 inches in diameter, about 4 inches in effective sensitive length and contains $He^3$ at about 8 atmospheres pressure. Using a 700 microgram Californium 252 neutron source which emits about $1.69 \times 10^9$ neutrons per second, it has been found that optimum source to detector spacings for these detectors are approximately 19 inches from the source to the center of the short spaced $He^3$ detector 12 and about 31 inches to the center of long spaced detector 13. These dimensions are applicable with the detectors configured as shown in the drawing of FIG. 1 when surrounded by the cadmium sleeve 18. The portion of the cadmium sleeve 18 interposed between the two detectors, as shown at 20 of FIG. 1, serves to limit solid angle response to the detectors to the approximate borehole level opposite each detector.

In the configuration shown in FIG. 1 for the neutron detectors, it has been found that the neutron count rate is reduced by about a factor of 4 when the detectors are surrounded by the cadmium sleeve 18 as illustrated, from the count rate obtained with the same $He^3$ detectors not surrounded by the cadmium sleeve. This reduction in count rate would render the spacing from the source to detectors too great to obtain good counting statistics when used with a lesser intensity neutron source than Californium 252 or actinium beryllium. Moreover, it will be noted that the sensitivity of the neutron detectors 12 and 13 are unequal as the short spaced detector 12 contains He at one atmosphere of pressure while the long spaced detector 13 contains $He^3$ at eight atmospheres pressure. Since the epithermal neutron count rate in a $He^3$ detector is proportional to the $He^3$ pressure, the long spaced detector 13 is more sensitive to epithermal neutrons than the short spaced detector. This cooperative arrangement is optimized for the use of the $1.69 \times 10^9$ neutron/sec. Californium 252 neutron source in the configuration shown. It will be appreciated by those skilled in the art that other source-detector spacings of optimum design could be used with other neutron sources, if desired, and still remain within the inventive concepts of the present invention.

Figure 2:
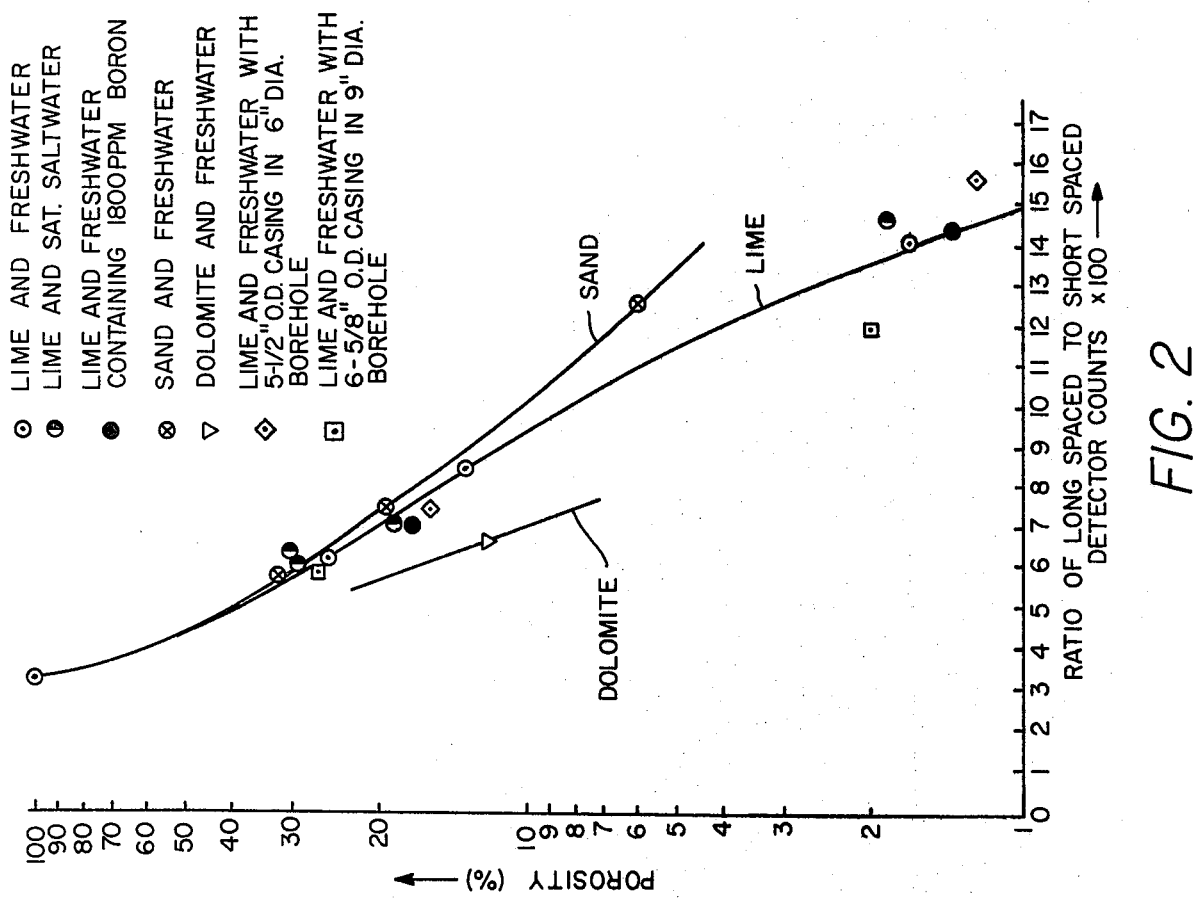
FIG. 2 is a graph illustrating the relationship of the ratio of the counts in the two epithermal neutron detectors of a well logging system such as that of FIG. 1 to the porosity of earth formations surrounding a borehole.

Voltage pulses from the neutron detectors 12 and 13 are amplified by the amplifiers 14 and 15 as previously discussed and transmitted to the surface via the well logging cable 8 and cable driver circuits 16. At the surface, circuitry is shown schematically in block diagram form for interpreting the ratio of the counts in each of the two spaced neutron detecotrs and for recording a log of this ratio. A log of the count rate from the short spaced detector is also made. Signals from the longer spaced detector 13 which may be encoded in any manner desired as previously described, are detected as counts in the counter 21. Counts from the short spaced detector 12 are detected in a second counter 22. Counters 21 and 22 may be of any of the well known types of digital or proportional analog counters known in the art. Outputs from counter 21 and counter 22 are sampled and supplied to a ratio circuit 23 which produces an output signal proportional to the ratio of counts in the long spaced detector 13 to the counts occurring in the short spaced detector 12. This ratio is shown in FIG. 2 as a function of formation porosity for three different types of formations in cased boreholes. It will be observed from FIG. 2 that the higher the ratio in the lower is the porosity of the formations surrounding the borehole. This is because a high porosity formation will generally contain more hydrogen bearing compounds such as oil or water in its pores and will therefore more rapidly attenuate the neutron flux emanating from the neutron source 11 than a lower porosity formation. The dual spaced epithermal neutron log of the present invention makes an accurate measure of the hydrogen index of the formation. The hydrogen index is defined as the quantity of hydrogen per unit volume of formation.

The output signals from the detectors 12 and 13 in the downhole tool, when taken in ratio form by the ratio circuit 23 which may be of conventional analog or digital design, are supplied to a recorder 24, which as indicated by dotted line 25, is driven either electrically or mechanically by the sheave wheel 9 as a function of borehole depth. Thus, a log is produced on a record medium 26 as a continuous recording of the ratio of counts of the long spaced to short spaced detectors and the count rate at the short spaced detector 12 as a function of borehole depth. This ratio may be interpreted as illustrated by FIG. 2 in terms of a borehole compensated porosity of the earth formations surrounding the borehole. The count rate at the short spaced detector may be interpreted in terms of an uncompensated porosity, similarly, by reference to the calibration curve of FIG. 3.

It will be understood by those skilled in the art that the power supply circuits 27 may be used to furnish electrical power for the downhole portion of the equipment via the well logging cable 8 and that downhole power circuits (not shown) are utilized to power the electronic circuitry shown in the downhole tool.

Although the sonde 7 shown in the drawing of FIG. 1 is suspended freely in the borehole 2, characteristics of the earth formation surrounding the borehole and the borehole environment itself, may make it advisable to centralize the housing of the sonde 7 within the borehole by means of bow springs or the like (not shown). Alternatively, a backup pad (not shown) can be used to urge the housing of the tool against the borehole wall. However, with the operating parameters as described herein for the source to detector spacing, the source composition, and intensity and the geometry shown in the drawing of FIG. 1 good sensitivity has been accomplished. Similarly the apparatus as shown and described minimizes the effect of neutron absorbers such as boron in formations surrounding the borehole.

If the percentage compensation, C, for borehole effects is defined as $$C = (\phi(R) - \phi(ss))/\phi(R) \times 100 \qquad (1)$$

where $\phi(R)$ represents the compensated porosity as measured by the ratio of count rates at the dual spaced detectors 12 and 13 and $\phi(ss)$ represents the uncompensated porosity as determined from FIG. 3 from the short spaced detector 12 count rate alone, then c can be used as an indicator of regions of borehole diameter variations, borehole washout, or cement void spaces. Such an indicator can be very valuable in the interpretation of other types of well logs which may be highly sensitive to borehole diameter variations. The indicator C can also be very valuable in locating cement voids which can lead to the undesired communication of fluids from one formation to another along the borehole.

Referring now to FIG. 4 a plot of the count rates $C_{ss}$ at the short spaced detector vs. the ratio R of the count rates ($R = C_{ss}/C_{LS}$) at the two detectors is shown for actual measurements taken in a South Texas well. The general trend of points in the well is shown by the plain dot points in FIG. 4. The circled dot points in the depth interval 4590 feet to 4610 feet and the squared dot points in the interval 4770 feet to 4790 feet illustrate the effect of a large value of the compensation percentage C parameter. These points are indicative of borehole washout or cement void in these two depth intervals.

It will be appreciated by those skilled in the art that the calibration curves of FIGS. 2 and 3 could be entered in tabular or analytic form in the memory of a small general purpose digital computer (not shown) and the computation of $\phi(R)$, $\phi(SS)$ and C made and logged directly as a function of depth, if desired. Moreover, magnetic tape recording of primary and secondary data can be performed. A small general purpose computer suitable for this purpose could be a model PDP-11 computer as supplied by the Digital Equipment Corporation of Cambridge, Mass. In this manner a direct record of the washed out or cement void regions of a well can be made at the well site.

The foregoing description may make other alternative arrangements apparent to those skilled in the art. The aim of the appended claims is, therefore, to cover all such changes and modifications as fall within the true spirit and scope of the invention.

I claim:

1. A method for locating borehole washouts or cement voids between the casing and earth formations in a well borehole, comprising the steps of:
   irradiating the earth formations in the vicinity of the borehole with fast neutrons from a relatively high intensity neutron source;
   detecting essentially only the epithermal neutron population at a first shorter spaced distance from said source in the borehole;
   detecting essentially only the epithermal neutron population at a second longer spaced distance from said source in the borehole;
   discriminating against the detection of the thermal neutron population at said detectors in the borehole;
   combining the epithermal neutron population measurements made at said two different spaced distances by taking a ratio of said epithermal neutron population measurements to derive a first, compensated, indication of formation porosity;
   deriving a second, uncompensated, indication of formation porosity from said measurement of the epithermal neutron population at said shorter spaced distance alone; and
   comparing said compensated and said uncompensated porosity indications by deriving a percentage compensation parameter C to locate the presence of borehole washouts or cement voids.

2. The method of claim 1 wherein the two epithermal neutron detecting steps are performed by employing cadmium wrapped He$^3$ detectors having effective sensitive centers at said longer and shorter spaced distances.

3. The method of claim 1 wherein said percentage compensation parameter is defined by the relationship $$C = (\phi(R) - \phi(ss))/\phi(R) \times 100$$

where $\phi(R)$ is the compensated porosity value and $\phi(ss)$ is the uncompensated porosity value.

4. The method of claim 1 wherein the steps are repeated at different depth levels in a well borehole and the compensated and uncompensated porosity indications are recorded as a function of borehole depth.

5. The method of claim 4 and further including the step of cross plotting the uncompensated and compensated porosity indications as an indication of the presence of borehole washouts or cement voids.

* * * * *